US012296959B2

(12) United States Patent
Pearson et al.

(10) Patent No.: US 12,296,959 B2
(45) Date of Patent: May 13, 2025

(54) IN-SEAT MINI-BAR FEATURES

(71) Applicant: B/E AEROSPACE, INC., Winston Salem, NC (US)

(72) Inventors: Matthew R. Pearson, Hartford, CT (US); Brian E. St. Rock, Andover, CT (US); Noah Avram Meltz Weichselbaum, Prairie Village, KS (US); Geoffrey L. Eisenhardt, Olathe, KS (US); Yasmin Khakpour, South Windsor, CT (US); Jefferey M. McKee, Duvall, WA (US)

(73) Assignee: B/E AEROSPACE, INC., Winston Salem, NC (US)

( * ) Notice: Subject to any disclaimer, the term of this patent is extended or adjusted under 35 U.S.C. 154(b) by 87 days.

(21) Appl. No.: 18/100,947

(22) Filed: Jan. 24, 2023

(65) Prior Publication Data
US 2023/0399107 A1    Dec. 14, 2023

Related U.S. Application Data

(60) Provisional application No. 63/350,352, filed on Jun. 8, 2022.

(51) Int. Cl.
*B64D 11/06* (2006.01)
*B60N 3/10* (2006.01)

(52) U.S. Cl.
CPC .......... *B64D 11/0602* (2014.12); *B60N 3/104* (2013.01)

(58) Field of Classification Search
CPC . B64D 11/0602; B64D 11/0605; B64D 11/06; B64D 2013/0629; B64D 13/08;
(Continued)

(56) References Cited

U.S. PATENT DOCUMENTS

| 4,157,112 A | 6/1979 | Swiderski |
|---|---|---|
| 4,361,014 A | 11/1982 | Blain |

(Continued)

FOREIGN PATENT DOCUMENTS

| CN | 106885413 | 3/2020 |
|---|---|---|
| DE | 19952524 | 5/2001 |

(Continued)

OTHER PUBLICATIONS

USPTO; Non-Final Office Action dated Sep. 30, 2024 in U.S. Appl. No. 18/100,906.
(Continued)

*Primary Examiner* — Miguel A Diaz
(74) *Attorney, Agent, or Firm* — SNELL & WILMER L.L.P.

(57) ABSTRACT

An in-seat mini-bar assembly, apparatus and method of manufacture is provided. The assembly includes a housing that is insertable into a compartment of the seating module and includes a container with an interior cavity that is conductively cooled by thermo-electric elements of a microchiller unit mounted on a conductive rear plate that forms an exterior side of the container. A vent is configured proximate to a front section of the housing to receive outside air forward of the housing for channeling the outside air to a rear section of the housing using a duct attached to the vent at the front section. The duct is shaped for a fluidic intake of the outside air by a frontal flange having a wide cross-sectional area that is gradually tapered to a circular cross-sectional area to direct the airflow in a uniform manner.

20 Claims, 7 Drawing Sheets

(58) Field of Classification Search
CPC ............... B60N 3/104; F25B 21/00–04; F25D 11/00–04; F25D 17/04–08; F25D 19/00–04; F25D 23/10
See application file for complete search history.

(56) References Cited

U.S. PATENT DOCUMENTS

| | | |
|---|---|---|
| 5,491,979 A | 2/1996 | Kull |
| 5,513,500 A | 5/1996 | Fischer |
| 5,826,432 A | 10/1998 | Ledbetter |
| 5,902,618 A | 5/1999 | Haasis, Jr. |
| 6,832,504 B1 | 12/2004 | Birkmann |
| 6,845,627 B1 | 1/2005 | Buck |
| 7,007,501 B2 | 3/2006 | Hu |
| 8,607,586 B2 | 12/2013 | Lu |
| 8,959,941 B2 | 2/2015 | Campbell |
| 9,191,999 B2 | 11/2015 | Anthony et al. |
| 9,267,714 B2 | 2/2016 | Hou et al. |
| 9,840,125 B2 | 12/2017 | Burd |
| 9,921,007 B2 | 3/2018 | Harper et al. |
| 9,987,902 B2 | 6/2018 | Burd |
| 10,252,805 B2 | 4/2019 | Chrabascz et al. |
| 11,136,125 B2 | 10/2021 | Tsai et al. |
| 11,306,958 B2 | 4/2022 | Moran |
| 2003/0042361 A1 | 3/2003 | Simadiris |
| 2005/0210910 A1 | 9/2005 | Rigney |
| 2008/0087039 A1 | 4/2008 | Reed |
| 2009/0107159 A1 | 4/2009 | Mann, III |
| 2009/0224564 A1 | 9/2009 | O'Brien et al. |
| 2009/0301120 A1 | 12/2009 | Godecker |
| 2010/0071384 A1 | 3/2010 | Lu et al. |
| 2012/0047911 A1 | 3/2012 | Bhavsar et al. |
| 2013/0047630 A1 | 2/2013 | Lu |
| 2013/0047657 A1 | 2/2013 | Oswald |
| 2013/0206905 A1* | 8/2013 | Savian .................. B64D 11/04 29/428 |
| 2013/0219948 A1 | 8/2013 | Aurekoski |
| 2013/0247590 A1 | 9/2013 | Lu et al. |
| 2014/0000837 A1 | 1/2014 | Simadiris |
| 2014/0102120 A1 | 4/2014 | Libis et al. |
| 2014/0299296 A1 | 10/2014 | Shubat |
| 2015/0059363 A1 | 3/2015 | Burd |
| 2015/0059385 A1 | 3/2015 | Burd |
| 2015/0089970 A1 | 4/2015 | Lu |
| 2015/0099446 A1 | 4/2015 | Burd |
| 2015/0259073 A1 | 9/2015 | Dabaga et al. |
| 2015/0266353 A1 | 9/2015 | Lu et al. |
| 2015/0289643 A1 | 10/2015 | Holtorf et al. |
| 2016/0338488 A1 | 11/2016 | Garcia |
| 2016/0340044 A1* | 11/2016 | Schalla .................. F28F 27/00 |
| 2017/0115039 A1 | 4/2017 | St. Rock et al. |
| 2017/0122647 A1 | 5/2017 | Burd |
| 2017/0282679 A1 | 10/2017 | Tsai et al. |
| 2018/0031327 A1 | 2/2018 | Chou et al. |
| 2018/0127101 A1 | 5/2018 | Burd |
| 2018/0201374 A1 | 7/2018 | Trumper |
| 2018/0281957 A1 | 10/2018 | Tsai et al. |
| 2019/0002105 A1 | 1/2019 | Moran |
| 2020/0348089 A1 | 11/2020 | Halbe et al. |
| 2021/0129992 A1 | 5/2021 | Sankrithi |
| 2021/0140699 A1 | 5/2021 | Moran |
| 2021/0387557 A1* | 12/2021 | Himmelreich .......... F25D 17/06 |

FOREIGN PATENT DOCUMENTS

| | | |
|---|---|---|
| DE | 102017113619 | 12/2018 |
| DE | 102017130722 | 6/2019 |
| EP | 1527996 | 3/2008 |
| EP | 2937284 | 10/2015 |
| EP | 3878745 | 9/2021 |
| EP | 4289736 | 12/2023 |
| GB | 654678 | 6/1951 |
| GB | 2095387 | 9/1982 |
| GB | 2580026 | 7/2020 |
| JP | 07218095 | 8/1995 |
| JP | 4677219 | 4/2011 |
| KR | 200402138 | 11/2005 |
| KR | 20060063108 | 6/2006 |
| WO | 2011150018 | 12/2011 |
| WO | 2015031888 | 3/2015 |
| WO | 2021110357 | 6/2021 |
| WO | 2021243155 | 12/2021 |

OTHER PUBLICATIONS

European Patent Office, European Search Report dated Oct. 9, 2023 in Application No. 23177789.7.
European Patent Office, European Search Report dated Oct. 12, 2023 in Application No. 23177938.0.
European Patent Office, European Search Report dated Oct. 13, 2023 in Application No. 23177791.3.
European Patent Office, European Search Report dated Oct. 12, 2023 in Application No. 23178235.0.
European Patent Office, European Search Report dated Oct. 26, 2023 in Application No. 23177782.2.
European Patent Office, European Search Report dated Oct. 30, 2023 in Application No. 23178082.6.
USPTO; Non-Final Office Action dated Dec. 11, 2024 in U.S. Appl. No. 18/158,873.
USPTO; Final Office Action dated Feb. 12, 2025 in U.S. Appl. No. 18/100,906.

* cited by examiner

IN-SEAT MINI-BAR FEATURES

CROSS-REFERENCE TO RELATED APPLICATIONS

This application claims benefit of priority under 35 U.S.C. 120 to U.S. Provisional Application Ser. No. 63/350,352 entitled "HIGH EFFICIENCY MICRO-CHILLER UNIT," filed on Jun. 8, 2022, the entire contents of which are incorporated by reference.

FIELD

The present disclosure generally relates to cooling enclosures within an aircraft, and more specifically to assembly, apparatus, and a method of manufacture of in-seat mini-bar of a cooling system configured for enclosures within, for example, an in-seat passenger compartment onboard an aircraft.

BACKGROUND

Premium class passengers that include first class and business are generally considered the most profitable passenger segment for carriers, and therefore carriers' desire to provide the premium class passengers with the highest comfort and service. This includes extending the class of service to not only commonly considered options such as passenger seating and space, but also to other services provided including providing chilled refreshments in a mini bar in the aircraft galley or in an in-seat passenger seating compartment. It has not been feasible to station compact refrigerator-type compartments in an aircraft mini-bar, galley monument, seat station or other smaller enclosures in the aircraft interior.

SUMMARY

In an embodiment, an in-seat mini-bar assembly configured in an aircraft seating module for receipt in a compartment integrated in the aircraft seating module is provided. The in-seat mini-bar assembly includes a housing that is insertable into the compartment integrated in the aircraft seating module wherein the housing includes a container with an interior cavity that is conductively cooled by thermo-electric elements of a micro-chiller unit mounted on a conductive rear plate that forms an exterior side of the container disposed of in the housing; and a vent configured proximate to a front section of the housing to receive outside air forward of the housing for channeling the outside air to a rear section of the housing using a duct attached to the vent at the front section; wherein the duct is shaped for a fluidic intake of the outside air by a frontal flange having a wide cross-sectional area to enable airflow of the outside air through the duct to the rear section wherein the duct is configured to taper to a circular cross-sectional area to direct the airflow in a uniform manner towards the micro-chiller unit at the rear section for conductive cooling of the interior cavity.

In various embodiments, the in-seat mini-bar assembly further includes a door for access to the container with a latching mechanism responsive to a manual action to cause the door to open for access to the interior cavity wherein the door is configured with a transparent insert to enable viewing inside the interior cavity.

In various embodiments, the in-seat mini-bar assembly further includes a heat sink that receives the outside air uniformly via the circular cross-sectional area of the duct across a set of fins configured with the heat sink.

In various embodiments, the outside air is radially expelled by the heat sink to one or more exterior vents.

In various embodiments, the in-seat mini-bar assembly further includes a rear assembly configured with a compact integration of a set of components having a reduced depth to enable the housing to conform to the compartment of the aircraft seating module.

In various embodiments, the in-seat mini-bar assembly's set of components further includes a blower configured with a low-profile motor to integrate within the heat sink to expel warmer air.

In various embodiments, the interior cavity is configured to store at least a set of multiple 12-ounce soda cans.

In various embodiments, the housing is configured as a stand-alone module which is swappable for replacement in the compartment in the aircraft seating module.

In various embodiments, the micro-chiller unit is configured to operate with a low voltage DC power supply of the aircraft seating module.

In various embodiments, the micro-chiller unit is configured to operate with a polarity in a forward direction to cool the interior cavity, and to operate with the polarity in a reverse direction to warm the interior cavity.

In various embodiments, the conductive rear is configured in a range of 1 to 2 millimeters in thickness.

In various embodiments, an in-seat mini-bar apparatus configured with uniform air flow is provided. The in-seat mini-bar apparatus includes an exterior housing formed to conform to a passenger seating monument, wherein the exterior housing is configured with a set of components including an interior compartment that is conductively cooled by thermo-electric elements of a micro-chiller unit mounted on a conductive rear plate that forms a side of the interior compartment; a front facing door with a latching mechanism for manual access to the interior compartment; a transparent insert configured in the front facing door for viewing of contents stored in the interior compartment; and a vent configured proximate to a frontal face of the exterior housing to receive outside air forward of the exterior housing wherein the outside air is funneled by a duct coupled to the vent wherein the duct is configured with gradual tapering in cross-sectional area to enable uniform airflow of the outside air to the micro-chiller unit for conductive cooling by a set of thermo-electric elements disposed in the micro-chiller unit of the exterior housing.

In various embodiments, the micro-chiller unit further includes a radially configured heat sink to receive the outside air and radially expel warmer air from the interior compartment to one or more exterior vents configured in the exterior housing.

In various embodiments, the outside air when expelled from the exterior housing is kept separate from an intake of the outside air to the exterior housing.

In various embodiments, the side of the interior compartment for conductive cooling comprises an aluminum alloy.

In various embodiments, the interior compartment is covered with a facially cosmetic sheet.

In various embodiments, the micro-chiller unit further includes a rear assembly configured with a compact integration of one or more components for a reduced depth to conform within the interior compartment of the passenger seating monument.

In various embodiments, the rear assembly further comprises a blower configured with a low-profile motor to integrate within a radially configured heatsink wherein the radially configured heatsink receives the outside air distributed across a set of uniform fins of the radially configured heatsink for heat transfer during conductive cooling of interior container.

In various embodiments, the interior compartment is configured to store a set of items that comprises at least soda cans.

In various embodiments, a method to manufacture of an in-seat mini-bar apparatus is provided. The method includes constructing a micro-chiller unit with a housing to conform to a monument of an aircraft seating module; disposing a micro-chiller unit with a set of thermo-electric elements in an interior cavity of the housing for conductive cooling wherein the micro-chiller unit is mounted on a conductive rear plate that forms a wall of the interior cavity; attaching a front facing door to the housing with a latching mechanism responsive to a manual action to cause the front facing door to open for access to the interior cavity; inserting a transparent insert within the front facing door for viewing of contents stored in the interior cavity; and constructing a vent proximate to a frontal face of the housing to receive outside air at a forward area of the housing and to direct by internal ducting coupled to the vent, the outside air to the micro-chiller unit for conductive cooling by the set of thermo-electric elements disposed in the micro-chiller unit wherein the internal ducting is configured with gradual changes in cross-sectional area for a fluidic airflow of the outside air to the micro-chiller unit.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
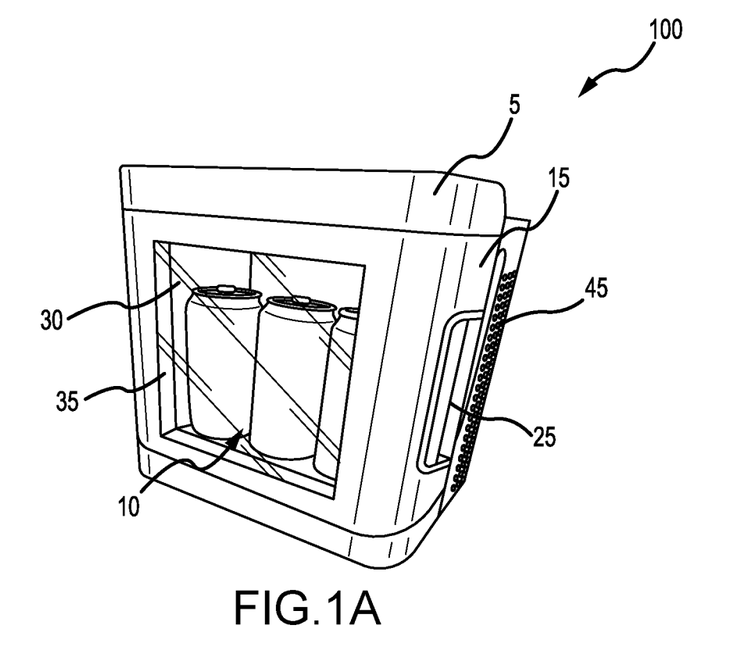
FIGS. 1A, 1B, and 1C illustrate an example in-seat mini-bar module that includes a micro-chiller unit configured to fit in a compartment/monument in a passenger seating module in accordance with various embodiments.

Referring to FIG. 1A, FIG. 1A illustrates an example in-seat mini-bar module that includes a micro-chiller unit configured to fit in a compartment/monument in a passenger seating module in accordance with various embodiments. The example in-seat mini-bar module 100 includes a micro-chiller enclosure system housed in an exterior housing 5 with an interior compartment 30 (container or interior cavity), a door 15, rear assembly 45 (with exterior venting), and a latching mechanism 25. The example in-seat mini-bar module 100 is a standalone module configured to seamlessly integrate into a monument or compartment configured in a seating module of an aircraft.

In various embodiments, the latching mechanism 25 can fasten the door to the exterior housing 5 to hold the door with a clasping action and can be opened with a one-handed manual operation that unlatches the door 15 from the exterior housing 5 by a pull action on a handle configured within the latching mechanism 25. In various embodiments, the passenger can pull the handle (integrated in the latching mechanism 25) and the door 15 would unlatch from the exterior housing 5 and open. In various embodiments, the latching mechanism 25 can enable a spring-loaded action of the door 15 to open the door 15, to enable reaching (via a one-hand operation) into the interior cavity upon the unlatching action of the latching mechanism 25 from the exterior housing 5. In this way, it may not be necessary to perform a two-step process of manually open the door and holding it open, and then reaching into the interior cavity for retrieving a beverage as the door 15 opens in one action for convenience upon the unlatching action. This operation follows other compartments such as the baggage compartments above the passenger seating module that open upon the unlatching action of the locking mechanism. Next, upon closure, to keep the door closed, a force is applied to actuate the latch operation to latch the door to the exterior housing 5. In this way, the door 15 is latched shut when the door is closed and latched. If the door is shut and the mechanism is not latched, then the door will open so notice is provided that the door has not been properly closed. In embodiments, a sensor or other notification may be configured to notify the passenger or other user that the door 15 has not be closed properly.

The door 15 can be configured to include a transparent insert (i.e., insert 10) that may be composed of a plexiglass material (e.g., polycarbonate) that has insulative properties. The insert 10 may also be composed of other non-opaque material, or semi-opaque material, or configured in glass. The insert 10 provides a window in the door 15 so the passenger can view the contents stored in the in-seat mini-bar module 100. In various embodiments, the insert can be constructed with more opaqueness and have a layering of a non-reflective or tinted film for an aesthetic covering of the exterior housing. This may also enable improvements in the thermal management of the cavity temperature caused by light exposure. In various embodiments, the door 15 attached to the exterior housing 5 is made of a combination of insulative material with a see-through insulated double-glazed polycarbonate insert (i.e., insert 10) that enables a convenient viewing of products stored in the interior compartment 30 of the exterior housing 5 without the need to open the latching mechanism 25 and door 15 to expose the interior contents. In various embodiments, at least one side of the in-seat mini-bar module 100 (excluding the door that incorporates a glass or other non-opaque material) are lined with insulation and may also include an optional cosmetic face sheet (e.g., stainless steel fascia) for aesthetics and protection. In various embodiments, the additional layer of insulation may reduce operational noise of the micro-chiller unit for passenger comfort as the in-seat mini-bar module 100 is placed close to the seated location of the passenger.

Figure 1B:
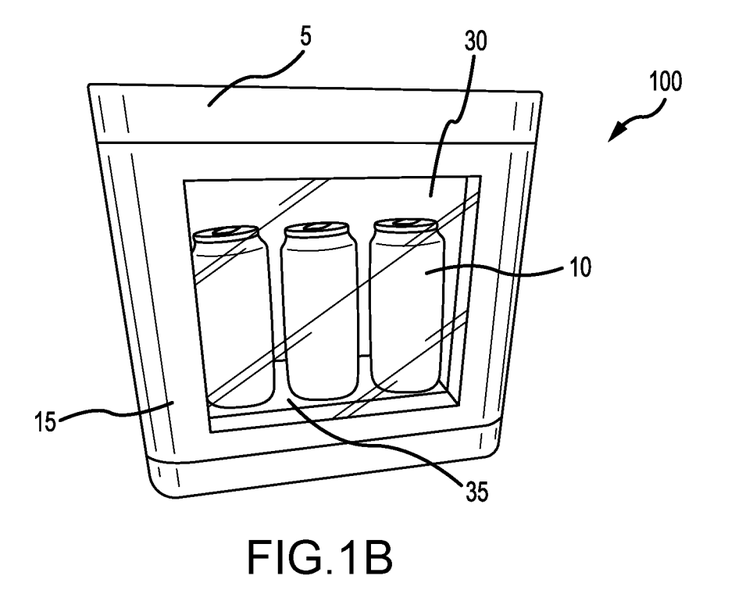

FIG. 1B illustrates another perspective of the in-seat mini-bar module 100 in which multiple canned refreshments are stored in accordance with various embodiments. The in-seat mini-bar module 100 can be configured with a shelf 35 that allows for storing and holding of multiple canned beverages. Even though FIG. 1B illustrates the storage of three 12-oz fluid cans in the interior of the in-seat mini-bar module 100, it is contemplated that the in-seat mini-bar module 100 dimensions can be changed to accommodate different size beverage canisters including bottles and cartons. In various embodiments, the interior cavity of the compartment 30 and shelf can be configured to support larger bottles, milk cartons, wine bottles, and other items. In various embodiments, sensors may be integrated into the shelf to notify flight crew when a canister is empty or removed.

In various embodiments, the internal volume of the enclosed space of the compartment 30 is configured in dimensions of approximately or in the range of 8 inches (20.3 cm) in height, 9 inches (22.86 cm) in width and 3.00 (7.62 cm) inches depth. In various embodiments, the compartment 30 (interior space) of the micro-chiller unit in the exterior housing 5 can store about 3 12-fluid-ounces (355-millimeter) cans of beverages (ex., soda can about 2.6 inches (6.6 cm) in diameter and 4.83 inches (12.3 cm) in height). It is contemplated, that the exterior housing 5 for the in-seat mini-bar module 100 can be configured in a variety of sizes and shapes configured to fit within particular aircraft in-seat compartments, galley carts, and other aircraft monuments.

Figure 1C:
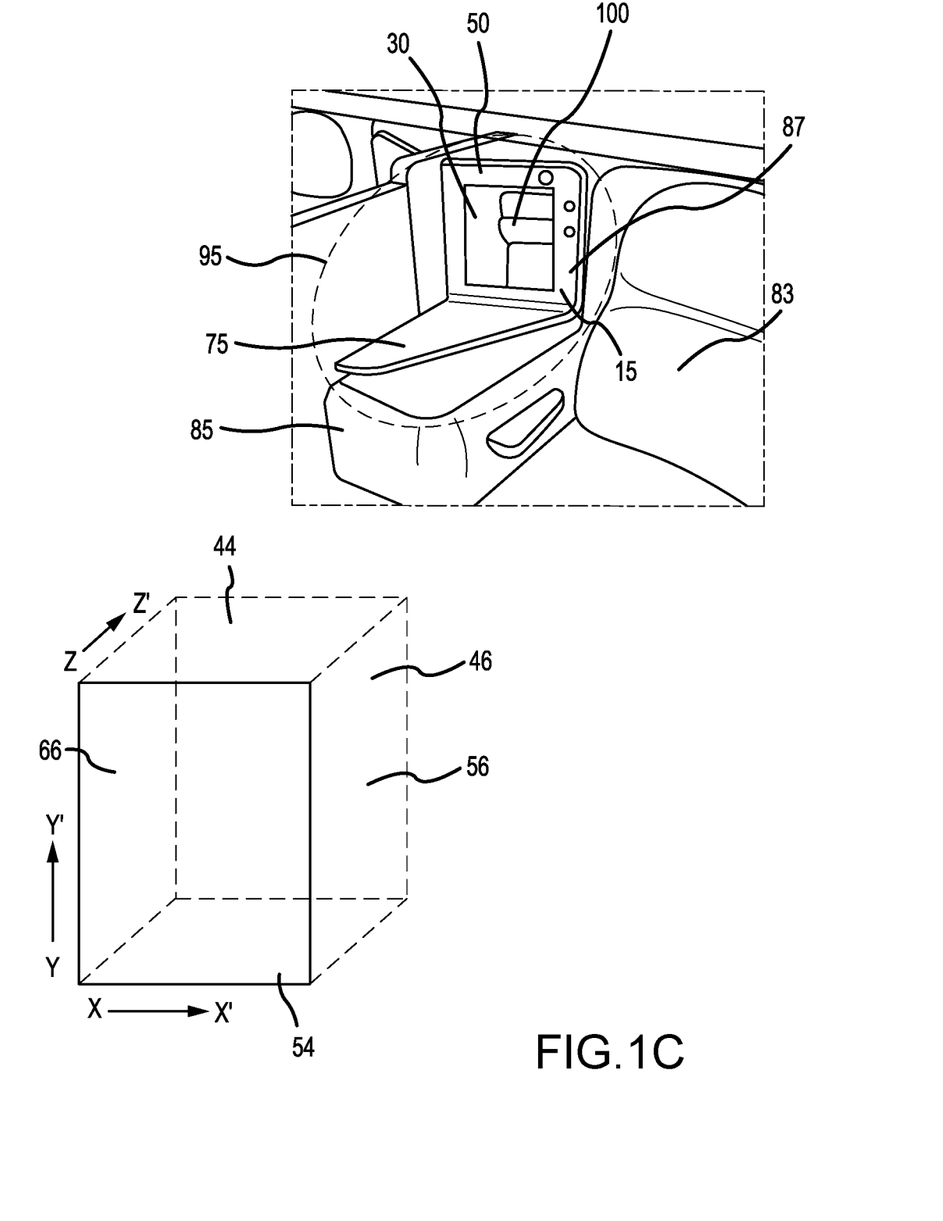

FIG. 1C illustrates a configurations of the in-seat mini-bar module 100 in an arm rest section of a passenger seating module 95 in accordance with various embodiments. In FIG. 1C, the in-seat mini-bar module 100 is positioned in the passenger seating module 95 above an arm rest 85 (or passenger seat divider) with a frontal face 87 positioned adjacent to the passenger seat 83 so the door 15 of the exterior housing 5 (of FIG. 1A) is easily accessible (within arm reach by a passenger) to perform manually the unlatching of the latching mechanism (of FIG. 1A) to open the door 15 and retrieve a cooled refreshment product without assistance, and at a time of choosing. In various embodiments, a tray 75 may be positioned or attached in the front of the in-seat mini-bar module 100 for convenient placement of the cooled refreshment product.

In various embodiments, the in-seat mini-bar module 100 is configured with power systems available in the seating module of the aircraft. For example, this can include low voltage DC power supplies and AC power supplies that are available for passenger's mobile devices and for on-screen monitors integrated in the seating module. The in-seat mini-bar module 100, as an example, has an internal AC/DC converter, or a DC/DC regulator to receive power from a 120 volts (60 hertz) AC current or a 12/24 volts DC current from a battery.

In various embodiments, the in-seat mini-bar module 100 includes a compartment 30 configured as a container (e.g., aluminum chill-pan) comprising a conductive material like aluminum that generally composed of five sides (e.g., a top side 44 (Y'-Z', Y'-X'), a bottom side 54 (Y-Z', X-X'), a left side 66 (Y-Y', Z-Z'), a right side 56 (X'-Z', Y-Y'), a back side 46 (Z'-X', Y'-Z').

In various embodiments, the in-seat mini-bar module 100 is an igloo style micro-chiller unit that can comprise a set of thermo-electric elements (e.g., Peltier elements) with a heat sink mounted on a radially concentric set of fins for heat dissipation with a blower mounted onto the top of the compartment. In implementation, the top wall of the compartment 30 is encapsulated by an aluminum plate of approximately 1-2 mm thick. The in-seat mini-bar module 100 in operation enables a cooling of the aluminum plate (via one or more Peltier modules), which cools the interior compartment 30. To provide increased cooling and power performance, the aluminum sheet may be extended and folded down over additional sides of the compartment and if a cosmetic face sheet is used, the cosmetic face sheet is bonded or riveted or otherwise coupled to the aluminum with, for example, an adhesive such as a thermal epoxy. The aluminum plate forms a barrier that prevents or at least lessens (intercepts) the heat entering the cooling compartment before it mixes with the internally distributed air flow or is expelled to the exterior by the channeled distributed air.

In various embodiments, the assembly of the in-seat mini-bar module 100 configured with multiple layers, a distributed channel of cooled air across each side, provides a compact, low-noise, modular, extensible architecture for chilling small spaces in an in-seat monument. In various embodiments, the in-seat mini-bar module 100 is a solid-state unit configured with no moving parts (common in a refrigeration unit) on either the beverage, food, or user (passenger) facing side of the system because the chilling operation is performed by cooling of the aluminum plate. In various embodiments, the only moving part of the assembly that makes up the in-seat mini-bar module 100 is a fan, which is placed behind the monument (container) structure of the exterior housing 5 and is out of view, and not accessible by the user.

In various embodiments, the in-seat mini-bar module 100 is an eco-friendly chilling unit (reducing the emission of ozone-depleting refrigerants into the atmosphere) that is a self-contained unit (i.e., the micro-chiller unit) that can be configured with opening of the door 15 in either direction (i.e., clockwise or counterclockwise) dependent on which side of the passenger seat 83 it is positioned, and dividers that conform to the cans, bottles and other refreshments for holding the items securely in the interior cavity of the compartment 30 in response to motion of the aircraft (especially during landing and take-off). The in-seat mini-bar module 100 can be configured to be easily insertable and swappable with a compartment of passenger seating module 95 to enable efficient repair by replacement of the entire module saving maintenance time and aircraft operational downtime.

Figure 2A:
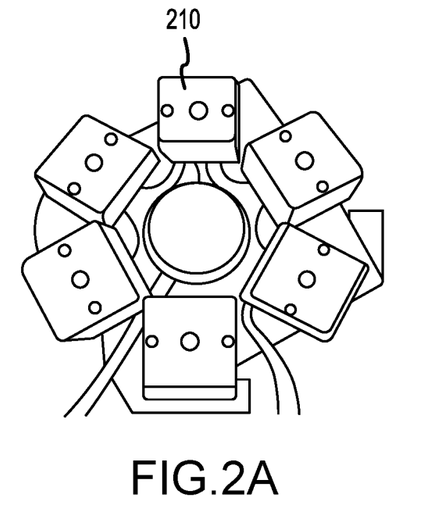
FIGS. 2A, 2B, 2C, and 2D illustrate components of the in-seat mini-bar module that includes the micro-chiller unit of FIGS. 1A-C in accordance with various embodiments.

FIGS. 2A, 2B, 2C, and 2D illustrate components of the in-seat mini-bar module that includes the micro-chiller unit of FIGS. 1A-C in accordance with various embodiments. FIG. 2A illustrates a set of aluminum spacers 210 which can be formed with standardized machining. The spacers are generally composed of a metal alloy (e.g., aluminum and alloys thereof) in a block form with high thermal conductivity for transferring changes in temperature to the desired space, container, or chill-pan to be cooled. The spacers 210 are selected of sufficient thickness to ensure consistent thermal connection with a set of thermo-electric elements (or Peltier elements) on which the spacers 210 are mounted and are not of an excessive thickness to produce any thermal inertia. The thermo-electric elements dissipate the extracted heat to outside the housing in a forward polarity arrangement, and in a reverse polarity heat the internal cavity. The spacers 210 add a protective layer to stresses and strains that may be experienced by a container wall from the cooling (and heating) effects on which the micro-cooler unit is mounted and are applied by the thermo-electric elements of the unit when current is applied. In various embodiments, the spacers 210 conduct thermal properties such as cooling by the thermo-electric elements at the surface of a wall of the container within the housing.

Figure 2B:
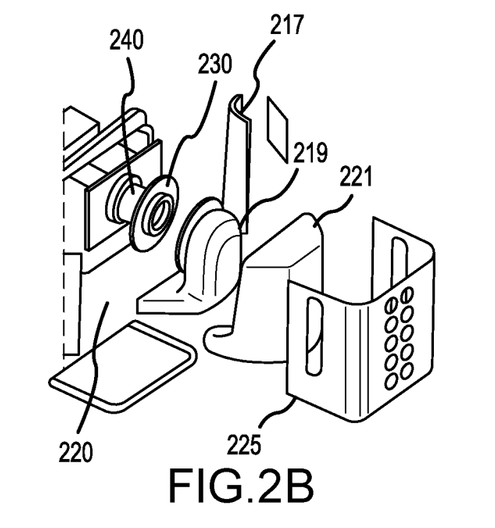

FIG. 2B illustrates a diagram of a high-level view of the set of components that make up the exterior portion (i.e., non-viewable components) of the assembly of the in-seat mini-bar module. The components shown of the assembly 220 are mounted on the exterior wall of the internal container and may include the radially configured heatsink 230, blower 240, support brackets 217, duct 219, cover for duct 221, and an exterior venting plate 225 attached to the rear of the container.

Figure 2C:
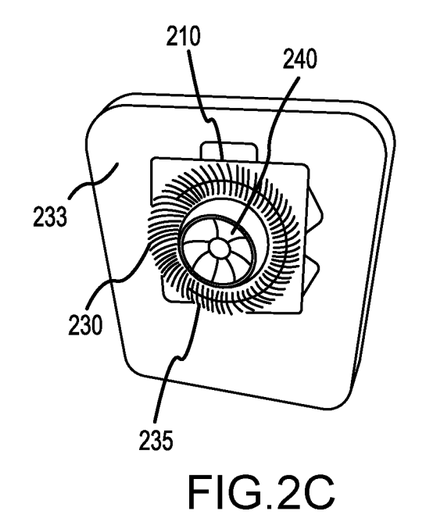

FIG. 2C illustrates a diagram of a radially configured heatsink 230 mounted to the aluminum spacers 210 illustrated in FIG. 2A. The radially configured heatsink 230 is attached on the outside or hot side of the container (i.e., within the housing) with the aluminum spacers 210 and attached to one side of the container (i.e., one of the 5 sides of the interior cavity). The interior side of the container attached to the micro-chiller unit is the cold side separated by a plate 233 that conducts the thermal cooling (conductive cooling) to the interior of the compartment. Other sides of the container may include an insulative layer to protect against heat seepage.

In various embodiments, the radially configured heatsink 230 includes parallel oriented fins 235 with a blower 240 in the center. The fins 235 are circularly arranged around the blower 240 to reduce local disturbances in cooling flow and to provide parallel air flow through the fins. The duct of the assembly in FIG. 2B is clamped or otherwise coupled to the mounting plate on which the heatsink 230 is also mounted to act as a conduit for the airflow to the heatsink 230. The fins 235 provide heat dissipation for heat transfer (away from the container) from the cooling airflow. The radially configured heatsink 230 can use a low voltage DC power source. In various embodiments, if the micro-chiller unit is configured in an in-seat housing, a power source (typically a DC power source) that is already available or connected to the aircraft seat can power the radially configured heatsink 230, and the other thermo-electric elements used. Because of the absence of refrigerant or supplied liquid coolant, the micro-chiller unit can be mounted with flexibility with any orientation including horizontally or at an angle without concern for liquid (such as refrigerant, water, or oil) circulation or interference from external refrigerator connections or condensation hoses.

Figure 2D:
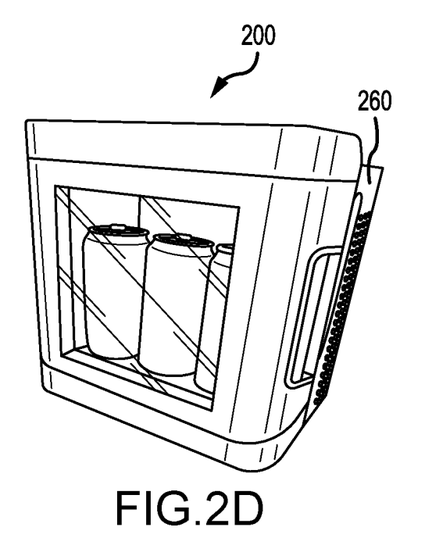

FIG. 2D is a diagram of the assembly of FIGS. 2A-C configured in a rear assembly of a single-sided chiller unit with an in-seat mini-bar module in accordance with various embodiments. The components described in FIGS. 2A-C are assembled and fitted in the rear assembly 260 mounted on the back of the in-seat mini bar module (attaching to the frame consisting of the assembly 200 of the front facing door connected to the exterior housing casing) in an unobstructive manner without significant protrusion to extend the depth of the unit given the limited space in the seating module.

Figure 3A:
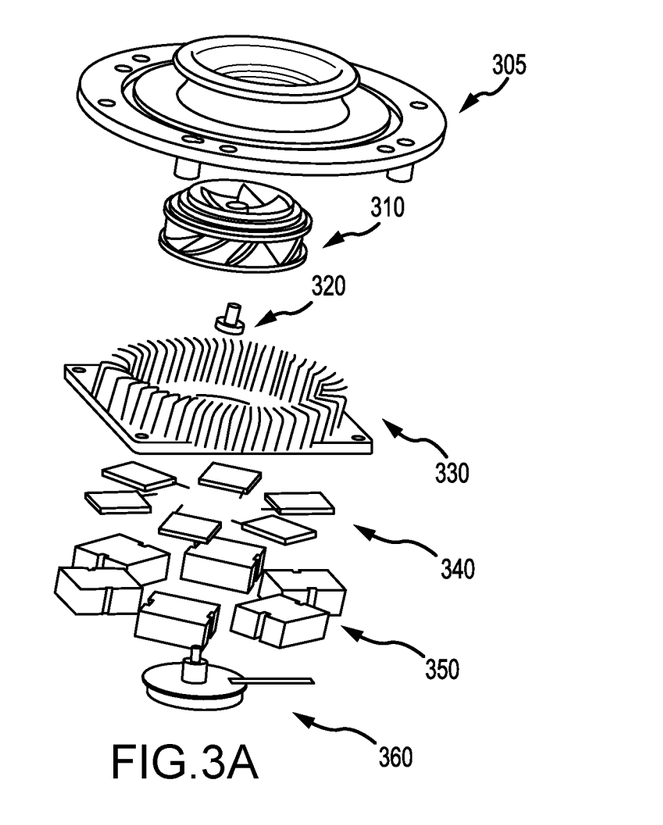
FIGS. 3A and 3B illustrate perspectives of the components that make up the assembly of the micro-chiller unit of the in-seat mini-bar module attached to the rear of the in-seat mini-bar module in accordance with various embodiments.
Figure 3B:
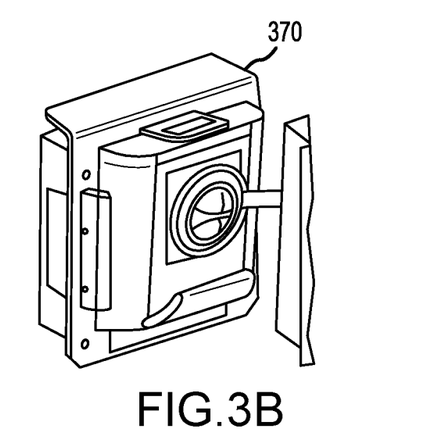

FIGS. 3A and 3B illustrate perspectives of the components that make up the assembly of the micro-chiller unit of the in-seat mini-bar module attached to the rear of the in-seat mini-bar module in accordance with various embodiments. In FIG. 3A, there is shown a diagram of the set of components that make up the core of the micro-chiller unit in the in-seat mini-bar module that include the cover 305, the blower 310, the motor adapter 320, the (radially configured) heat sink 330, the set of thermo-electrics (TE) (or Peltier elements) 340, the set of aluminum spacers (thermally conductive material) 350, and the motor 360 typically a low type profile motor to include in the limited enclosure space in the seating module. In FIG. 3B, there is shown a diagram of a compact assembled module 370 of the set of individual components illustrated in FIG. 3A that can be affixed to an inside wall of the in-seat mini-bar module that allows to thermal cooling of a rear plate of the in-seat mini-bar module and for reduced depth and protrusion in the limited space of the compartment in the seating module that the in-seat mini-bar module is inserted.

Figure 4:
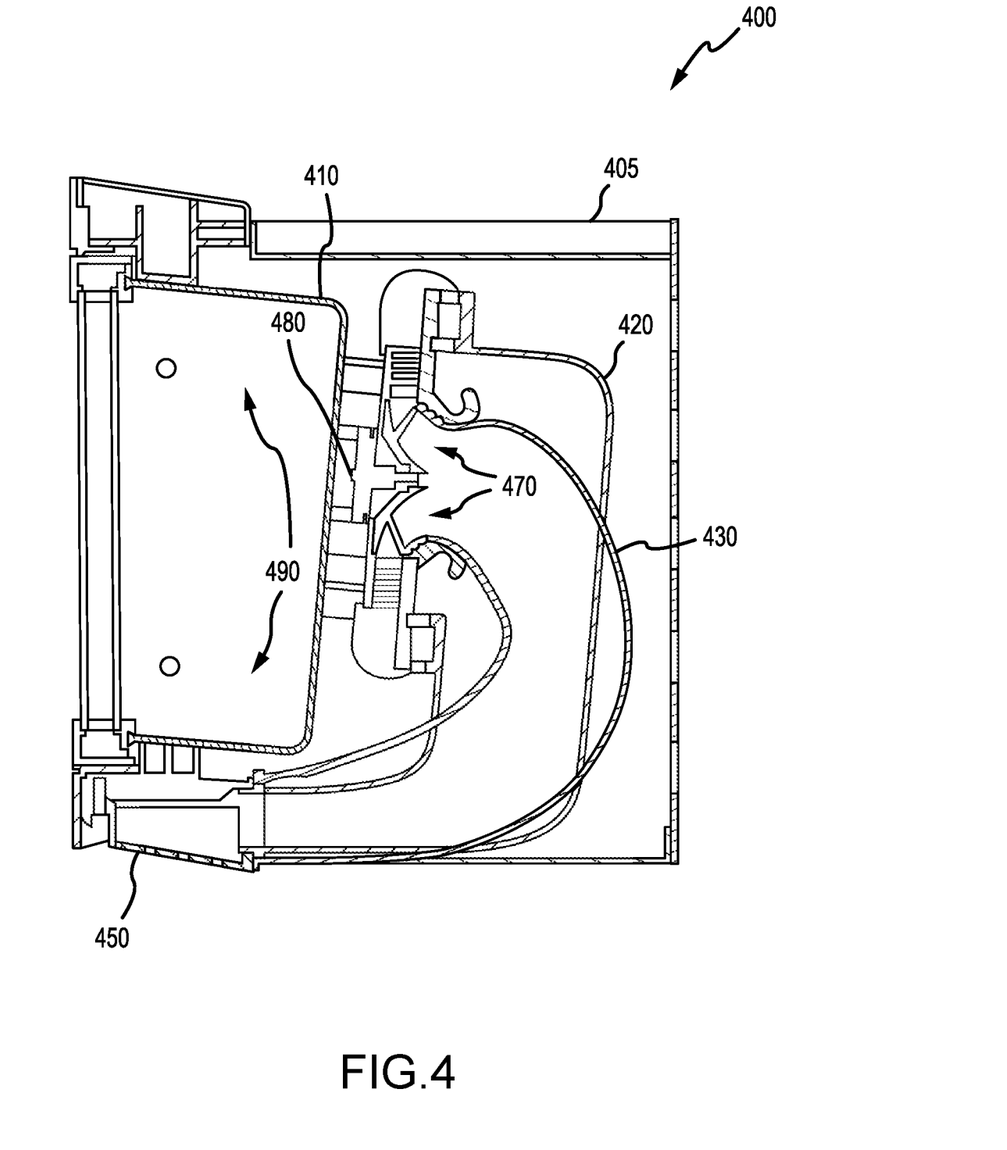
FIG. 4 illustrates a view of a diagram of an assembly of the in-seat mini-bar module that includes the micro-chiller unit, and ingress and egress airflow in a housing in accordance with various embodiments.

FIG. 4 illustrates an assembly of a view of the in-seat mini-bar module that includes the micro-chiller unit and ingress and egress airflow in a housing in accordance with various embodiments. In FIG. 4 there is shown the in-seat mini-bar module 400, that includes a housing 405 that can be installed in an in-seat compartment or other aircraft monument. In various embodiments, the housing 405 includes the solid-state components for the cooling operation except for the blower unit moving parts. In various embodiments, the components are non-corrosive used in the cooling operation and can withstand vibrations and shaking experienced during aircraft operations.

In various embodiments, the described components of the assembly within the housing of the interior container (multi-sided container) that forms a cavity for cooling with an insulative layer configured on each side that prevent thermal seepage of exterior hotter air from the sides of the housing. In FIG. 4, there is shown the atypically shaped duct 430 that is both curved and ringed (i.e., irregular shaped duct) with a cylindrical topology in which a proximal end is wider to enable a volume of outside air to be drawn in by the micro-chiller unit 480 attached to the rear wall of the interior container, and allows cool air circulated in the interior container. The micro-chiller unit expels warmer air radially rejected by the unit to the outside environment.

The curved, ringed, and/or irregular shaped duct (i.e., the duct 430) is formed in a manner to efficiently drawn in the air flow and to prevent any re-ingesting or static motion of the air flow (as opposed to a cornered rectangular pitched box 420) when drawn in by utilizing features in its configured topology that prevent air disturbances in the airflow. The topology of the atypical duct 430 can include the following features to streamline the airflow: an indentation towards the duct's distal end and a spherical hump configured before the duct's coupling with an outlet that expunges the air into the micro-chiller unit 480. In various embodiments, via the vent 450, outside air is drawn into the unit through the irregular shaped duct (i.e., the duct 430), by a blower to the micro-chiller unit 480 configured with a radially configured heatsink that expels the hotter air (radially). The cooler air is circulated in the container using one or more thermocouple elements spaced apart by aluminum spacers that provide cooling to the container.

In various embodiments, the irregular shaped duct 430 channels the outside air into two pathways 470 in the micro-chiller unit 480. Each pathway 470 provides a channel for air distribution across a set of fins of a radially configured heatsink within the micro-chiller unit 480. Hence, the irregular shaped duct 430 routes or separates the air flow by its configuration to distribute the airflow more effectively across a cross sectional area exposed to the fins of the radially configured heatsink. This enables two paths 490 of circulation channels of air within the container 440 to uniformly cool the upper and lower parts of the container 440 with cool air of approximately or of a similar temperature gradient in the cooling operation. In various embodiments, the radially configured heatsink ingests air, generates centrally cooled air, and with a curved non-linear duct configuration enables a higher and more optimized throughput of the cool air to circulate internally in the container of the housing.

Figure 5:
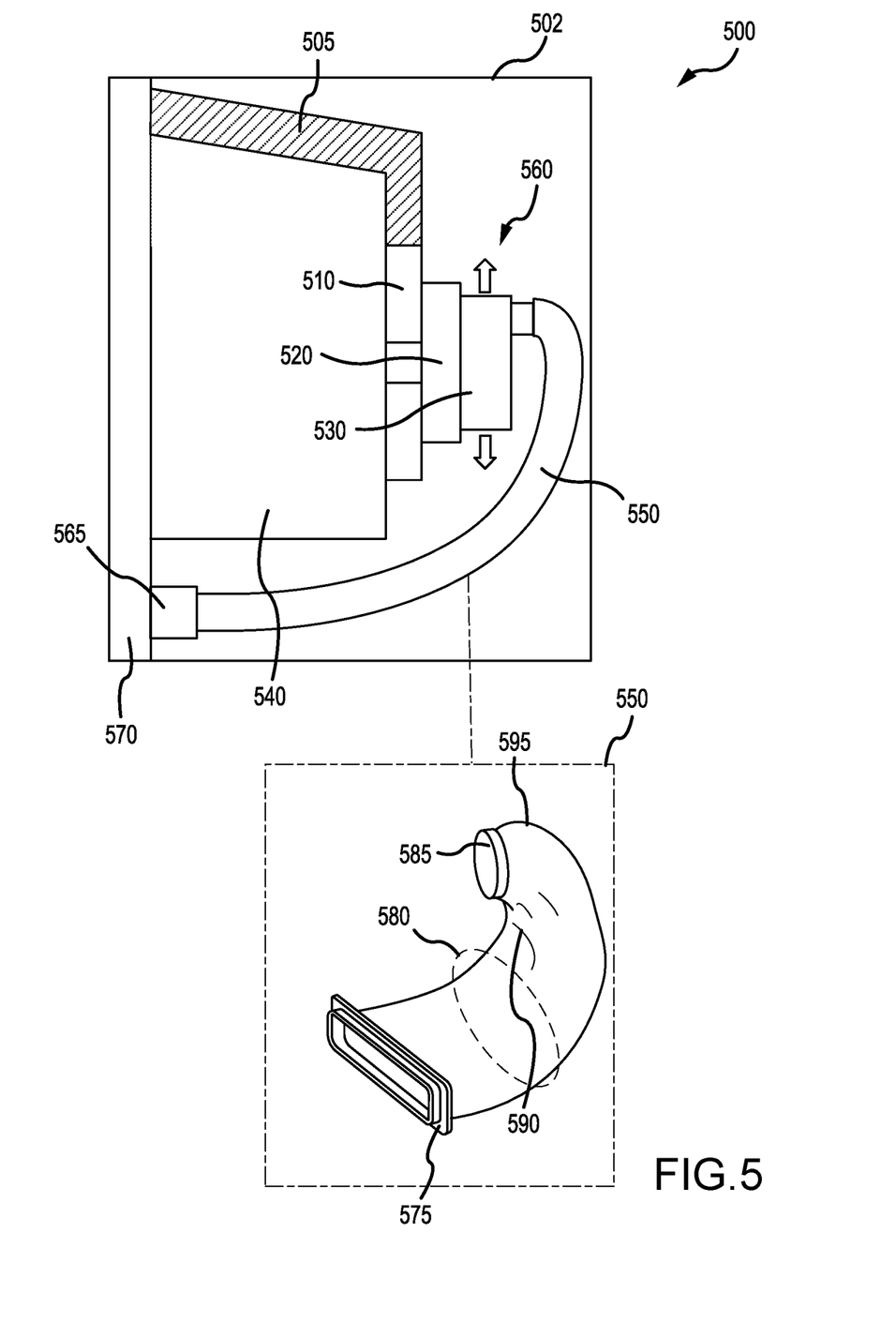
FIG. 5 illustrates a diagram of a side view of the in-seat mini-bar module that includes the set of components for a single-sided configuration of the micro-chiller unit mounted on the rear wall of the interior cavity within the exterior housing in accordance with various embodiments.

FIG. 5 illustrates a diagram of a side view of the in-seat mini-bar module 500 that includes the set of components for a single-sided configuration of the micro-chiller unit mounted on the rear wall of the interior cavity within the exterior housing in accordance with various embodiments. In FIG. 5, there is shown an in-seat mini-bar module 500 that includes the micro-chiller unit 520 and a container 540 with a slight inward tilt and that makes up the interior cavity in the exterior housing 502; the tilting is to prevent liquid from opened containers (i.e., soda cans) from spilling out, such as from turbulence in flight, from the exterior housing 502 into the passenger seating area. In various embodiments, the container 540 tilting can configure an air curtain type barrier where the circulated cooler air is retained inside the container 540 by inward airflow caused by the container 540 wall angles. This can result in energy saving by keeping the cooler interior air of the container 540 from mixing with outside air when the door is opened at the frontal face 570 of the exterior housing 502.

In various embodiments, the exterior housing 502 includes the heatsink 530 that repels the hotter air, and the micro-chiller unit 520 mounted to aluminum spacers 510 for conductively cooling the interior of the container 540. In some embodiments, the curved, ringed, and irregular shaped duct (i.e., the duct 550) exhibits an irregular topology for the fluidic flow of the outside air received from the vent 565.

In various embodiments, the irregular shaped duct (i.e., the duct 550) has a tapered or funnel type shape that enables it to be joined or mated to the vent 565 of the exterior housing 502 at its proximate end with a wide flange face 575 (i.e., a wider lip) for the outside air intake. The duct's 550 wider face is configured with a wider and flatter cross-sectional area (i.e., wider elliptical cross section area that can be configured with a greater width constrained to the width dimensions of the housing and a narrower height) to draw in the outside air uniformly. The duct 550 is then gradually changed in shape (resulting in changes in the ducting topology) or tapered to a circular cross-sectional area at the flange receptable 585 to target, funnel or direct the airflow to the micro-chiller unit 520. In various embodiments, an indentation 590 is configured in an interior side of the duct to assist in the upward direction for the uniform distribution of airflow towards the center portion of the duct cavity. Also, a slight hump 595 is configured on the exterior side of the duct 550 to direct the direction of the airflow as it is angled towards the flange receptable 585 towards the micro-chiller unit 520 to attempt to maintain the airflow towards the center cavity of the duct 550 during the angling process flow.

In various embodiments, via the vent 565, outside air is drawn into the unit through the irregular shaped duct (i.e., the duct 550), by the blower unit to the micro-chiller unit 520 configured with a radially configured heatsink that expels the hotter air (radially 560). The cooler air is circulated in the container 540 using one or more thermo-couple elements spaced apart by aluminum spacers 510 that provide cooling to the container 540. The insulative layer 505 provides a barrier to heat seepage from outside warmer air and from any warmer air radially repelled by the micro-chiller unit 520.

In various embodiment, the atypically configured duct (i.e., the duct 550) is fitted within the exterior housing 502 of the in-seat mini-bar module 500. The vents at the exterior of the exterior housing 502 enable hotter air to be dissipated from the unit radially expelled 560 by the heatsink 530. In embodiments, the dimensions of the in-seat mini-bar module are approximately 10.75 inches (27.3 cm) height, 13.25 inches (33.65 cm) width, and 12.5 inches (31.75 cm) in depth. The module is approximately 12.1 lbs. (5.5 kgs) with 10% of the weight constituting the micro-chiller unit 520. The pull-down time is approximately 31 minutes for 4 degrees Celsius with an appropriate power level beneficial to maintain the temperature of approximately 21.8 watts and an outlet air temp less than 30 degrees Celsius.

Figure 6:
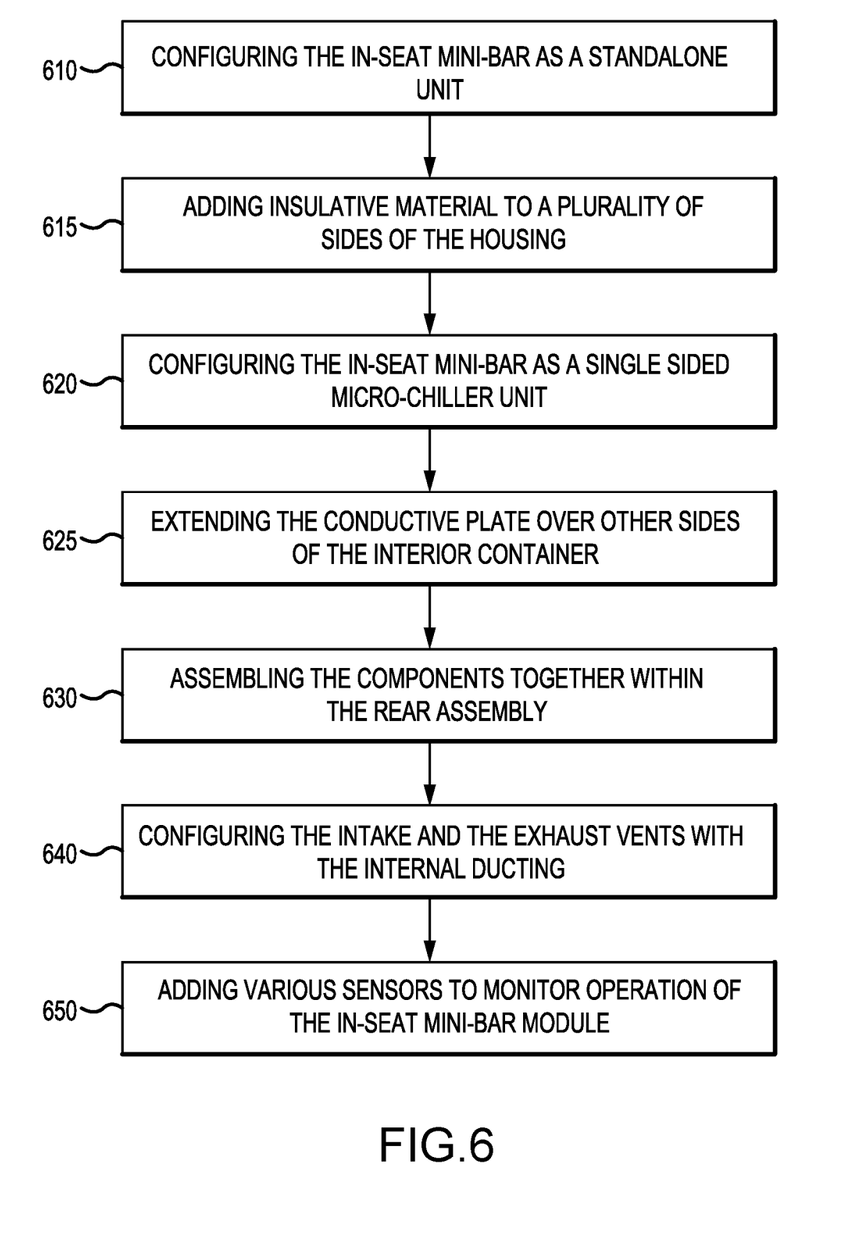
FIG. 6 illustrates a flow diagram for configuring an assembly of the in-seat mini-bar module in a compartment of a seating module of the aircraft in accordance with various embodiments.

FIG. 6 illustrates a flow diagram for configuring an assembly of the in-seat mini-bar module in a compartment of a seating module of the aircraft in accordance with various embodiments. The method 600 for ease of description is described with forming of the duct, the heatsink and thermo-electric assembly, and container within the exterior housing to configure the in-seat mini-bar module. However, the description is not limited to assembly of the referred to components but can include other components and parts put together to build the in-seat mini bar module. In various embodiments, at step 610, the in-seat mini-bar module is configured as a stand-alone unit that can be inserted into a compartment of a passenger seating module.

The compartment of the seating module is matched to accept the exterior housing that makes up the in-seat mini-bar module. For example, the in-seat mini-bar module can be swapped into an empty compartment area of the seating module and be held in with a cover plate or other bracket with little tooling or modification of the situs. The exterior housing of the in-seat mini-bar module can consist of a plate made up of an aluminum sheet or other lightweight conductive material with comparable properties of a thickness of 1-2 mm to maintain a rigid form within a certain lightweight criteria.

At step 615, all (or as many as desired) the sides of the exterior housing (except for the door with a glass or plastic flexible non-opaque insert combined with an insulative layer), are lined with an insulative lay and an optional cosmetic face sheet. At step 620, the in-seat mini-bar is configured as a single sided unit with a single micro-chiller unit mounted to a rear plate on its internal container, and this rear plate is cooled by conduction resulting in passive cooling of the internal cavity area. At step 625, the (conductive) plate within the in-seat mini bar module may be configured to extended down and folded over additional sides of the internal cavity with a cosmetic sheet that can be bonded or riveted to the aluminum plate with an optional layer configured of thermal epoxy. The aluminum sheet will intercept any heat entering the housing in which the internal cavity is disposed before it causes any thermal seepage with the cooler air of the internal cavity.

At step 630, the outside rear assembly mounted to the exterior wall of the internal cavity is assembled and includes the components assembled together of the blower, thermoelectric elements, aluminum spacers, and the radially configured heatsink. The duct is configured with a tapered shape that funnels the airflow with changes in its cross-sectional area. In various embodiments, the duct is differently or irregularly in its body, and on one end it is attached to the assembly and on the other end, the duct is attached to an exterior vent to draw in the outside air with its particular atypical shape in a fluidic and uniform manner. The exterior vent is a front facing or proximately frontally located vent positioned near or within the frontal face of the in-seat mini-bar module and enables the intake of outside air forward of the in-seat mini-bar module. At step 640, the venting of the expelled air is fashioned at the rear of the exterior housing or can be configured on the opposite frontal sides of the rear part of the compartment if the seating module does not provide venting. In various embodiments, separate venting channels can be configured with the seating module to vent the air across electronics in the vicinity (i.e., display monitors integrated in the seating module) to cool the electronics and provide efficient use of the expelled air. Other uses of the vented air may include more filtration of the expelled air in the seating module by airflow distribution from the in-seat mini-bar module.

At step 650, the in-seat mini-bar module may be configured with various sensors to notify if the door is opened, the refreshments need to be re-stocked, or the cooling operation is malfunctioning. The in-seat mini-bar module can be configured in a variety of designs and colors by different cover plates to, in instances, match the seating module look and feel. Further, locking features can be added to limit access to alcoholic beverages that may be stored in the in-seat mini-bar.

In various embodiments, a credit card or other charging methods can be coupled to access to the in-seat mini-bar module via, an app on a smart device of the passenger or by other payment systems already in use with the passenger seating module (e.g., for example payment processors integrated with a display system in the seating module), to give access to the passenger to the in-seat mini-bar refreshments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 312(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An in-seat mini-bar assembly configured in an aircraft seating module for receipt in a compartment integrated in the aircraft seating module, the in-seat mini-bar assembly comprising:
   a housing configured for insertion into the compartment integrated in the aircraft seating module wherein the housing comprises:
   a container with an interior cavity that is conductively cooled by thermo-electric elements of a micro-chiller unit mounted on a conductive rear plate that forms an exterior side of the container disposed of in the housing; and
   a vent configured adjacent to a front section of the housing to receive outside air forward of the housing for channeling the outside air to a rear section of the housing using a duct attached to the vent at the front section;
   wherein the duct is shaped for a fluidic intake of the outside air by a frontal flange having a wide cross-sectional area to enable airflow of the outside air through the duct to the rear section wherein the duct tapers to a circular cross-sectional area to direct the airflow in a uniform manner towards the micro-chiller unit at the rear section for conductive cooling of the interior cavity.

2. The in-seat mini-bar assembly of claim 1, further comprising:
   a door for access to the container with a latching mechanism responsive to a manual action to cause the door to open for access to the interior cavity wherein the door is configured with a transparent insert to enable viewing inside the interior cavity.

3. The in-seat mini-bar assembly of claim 2, further comprising:
   a heat sink that receives the outside air uniformly via the circular cross-sectional area of the duct across a set of fins configured with the heat sink.

4. The in-seat mini-bar assembly of claim 3, wherein the outside air is radially expelled by the heat sink to one or more exterior vents.

5. The in-seat mini-bar assembly of claim 4, further comprising:
   a rear assembly configured with an integration of a set of components having a depth to enable the housing to conform to the compartment of the aircraft seating module.

6. The in-seat mini-bar assembly of claim 5, the set of components further comprising:
   a blower configured with a motor to integrate within the heat sink to expel warmer air.

7. The in-seat mini-bar assembly of claim 6, wherein the interior cavity is configured to store at least a set of multiple 12-ounce soda cans.

8. The in-seat mini-bar assembly of claim 7, wherein the housing is configured as a stand-alone module which is swappable for replacement in the compartment in the aircraft seating module.

9. The in-seat mini-bar assembly of claim 8, wherein the micro-chiller unit is configured to operate with a DC power supply of the aircraft seating module.

10. The in-seat mini-bar assembly of claim 9, wherein the micro-chiller unit is configured to operate with a polarity in a forward direction to cool the interior cavity, and to operate with the polarity in a reverse direction to warm the interior cavity.

11. The in-seat mini-bar assembly of claim 10, wherein the conductive rear is configured in a range of 1 to 2 millimeters in thickness.

12. An in-seat mini-bar apparatus configured with uniform air flow comprising:
    an exterior housing formed to conform to a passenger seating monument, wherein the exterior housing is configured with a set of components comprising:
    an interior compartment that is conductively cooled by thermo-electric elements of a micro-chiller unit mounted on a conductive rear plate that forms a side of the interior compartment;
    a front facing door with a latching mechanism for manual access to the interior compartment;
    a transparent insert configured in the front facing door for viewing of contents stored in the interior compartment; and
    a vent configured adjacent to a frontal face of the exterior housing to receive outside air forward of the exterior housing wherein the outside air is funneled by a duct coupled to the vent wherein the duct has a gradual tapering in cross-sectional area to enable uniform airflow of the outside air to the micro-chiller unit for conductive cooling by the thermo-electric elements disposed in the micro-chiller unit of the exterior housing.

13. The in-seat mini-bar apparatus of claim 12, wherein the micro-chiller unit further comprises:
    a radially configured heat sink to receive the outside air and radially expel warmer air from the interior compartment to one or more exterior vents configured in the exterior housing.

14. The in-seat mini-bar apparatus of claim 13, wherein the outside air when expelled from the exterior housing is kept separate from an intake of the outside air to the exterior housing.

15. The in-seat mini-bar apparatus of claim 14, wherein the side of the interior compartment for conductive cooling comprises an aluminum alloy.

16. The in-seat mini-bar apparatus of claim 15, wherein the interior compartment is covered with a facially cosmetic sheet.

17. The in-seat mini-bar apparatus of claim 16, wherein the micro-chiller unit further comprises:
    a rear assembly configured with an integration of one or more components for a depth to conform within the interior compartment of the passenger seating monument.

18. The in-seat mini-bar apparatus of claim 17, wherein the rear assembly further comprises a blower configured with a motor to integrate within the radially configured heatsink wherein the radially configured heatsink receives the outside air distributed across a set of uniform fins of the radially configured heatsink for heat transfer during conductive cooling of interior container.

19. The in-seat mini-bar apparatus of claim 18, wherein the interior compartment is configured to store a set of items that comprises at least soda cans.

20. A method to manufacture of an in-seat mini-bar apparatus comprising:
- constructing a micro-chiller unit with a housing to conform to a monument of an aircraft seating module;
- disposing the micro-chiller unit with a set of thermo-electric elements in an interior cavity of the housing for conductive cooling wherein the micro-chiller unit is mounted on a conductive rear plate that forms a wall of the interior cavity;
- attaching a front facing door to the housing with a latching mechanism responsive to a manual action to cause the front facing door to open for access to the interior cavity;
- inserting a transparent insert within the front facing door for viewing of contents stored in the interior cavity; and
- constructing a vent adjacent to a frontal face of the housing to receive outside air at a forward area of the housing and to direct by internal ducting coupled to the vent, the outside air to the micro-chiller unit for conductive cooling by the set of thermo-electric elements disposed in the micro-chiller unit wherein the internal ducting has gradual changes in cross-sectional area for a fluidic airflow of the outside air to the micro-chiller unit.

* * * * *